US00RE39710E

(19) United States
(12) Reissued Patent
Young et al.

(10) Patent Number: US RE39,710 E
(45) Date of Reissued Patent: Jul. 3, 2007

(54) SYSTEM FOR PROVIDING ASSURED POWER TO A CRITICAL LOAD

(75) Inventors: Douglas Gibbons Young, Henderson, NV (US); Herbert C. Healy, Windsor, CT (US); Francis A. Fragola, Jr., Wallingford, CT (US); Ricky M. Ross, Ellington, CT (US)

(73) Assignee: UTC Fuel Cells, LLC, South Windsor, CT (US)

(21) Appl. No.: 10/802,119

(22) Filed: Mar. 16, 2004

Related U.S. Patent Documents

Reissue of:
(64) Patent No.: 6,465,910
Issued: Oct. 15, 2002
Appl. No.: 09/782,402
Filed: Feb. 13, 2001

(51) Int. Cl.
*H02J 7/00* (2006.01)

(52) U.S. Cl. ..... 307/64; 307/43; 307/44; 307/45; 307/70; 307/80

(58) Field of Classification Search ..... 307/43, 307/44, 45, 64, 70, 80, 66
See application file for complete search history.

(56) References Cited

U.S. PATENT DOCUMENTS

| | | | | |
|---|---|---|---|---|
| 4,004,947 | A | 1/1977 | Bloomfield | 429/17 |
| 5,401,589 | A | 3/1995 | Palmer et al. | 429/13 |
| 5,573,867 | A | 11/1996 | Zafred et al. | 429/17 |
| 5,579,197 | A | 11/1996 | Mengelt et al. | 361/93 |
| 5,750,278 | A | 5/1998 | Gillett et al. | 429/24 |
| 5,783,932 | A | 7/1998 | Namba et al. | 322/16 |
| 5,986,354 | A | 11/1999 | Nagao et al. | 307/64 |
| 6,011,324 | A | 1/2000 | Kohlstruck et al. | 307/64 |
| 6,198,176 | B1 | 3/2001 | Gillette | 307/64 |
| 6,198,177 | B1 * | 3/2001 | Mao et al. | 307/66 |
| 6,288,456 | B1 | 9/2001 | Cratty | 307/64 |
| 6,583,523 | B1 | 6/2003 | Bhate | 307/86 |
| 6,602,627 | B2 | 8/2003 | Liu et al. | 429/23 |
| 2003/0012038 | A1 * | 1/2003 | Welches et al. | 363/34 |

FOREIGN PATENT DOCUMENTS

WO WO 99/60687 11/1999

* cited by examiner

*Primary Examiner*—Robert L. Deberadinis
(74) *Attorney, Agent, or Firm*—Stephen A. Schneeberger

(57) ABSTRACT

A power system (8) is provided for economically supplying uninterrupted electrical power to one or more critical loads (14). One or more fuel cell power plants (18) provide one substantially continuous source of power, and a utility grid (10) provides another source of power. The fuel cell power plants (18) are [adapted to be, and are,] normally substantially continuously connected and providing power to, the critical load(s) (14). A rapidly-acting static switch (19) selectively [connects and] disconnects *and reconnects* the grid power supply (10) to the critical load(s) (14) and with the fuel cell power plant(s) (18) *for abnormal and normal grid operation, respectively*. A switch controller (49, 45) controls the state of the static switch (19) to [connect the grid power source (10) with the critical load(s) (14) and the] *rapidly (less than 4 ms) make the disconnections and the reconnections. The* fuel cell power plant(s) (18) [during normal operation of the grid (10), and to rapidly (less than 4 ms) disconnect the grid power source (10) from the load(s) (14) and the fuel cell power plant(s) (18) when operation of the grid (10) deviates from normal beyond a limit.] *each include power conditioning systems (PCS) indirectly controlled by the switch controller (49, 45) to in turn rapidly transition the (PCSs) of the fuel cell power plants (18) between grid connected and grid independent modes.*

19 Claims, 5 Drawing Sheets

FIG.6

MODE STATE TABLE

| MODE OF OPERATION | SW 19 MODE SIGNAL | | SW 19 STATUS | PCS GRID SENSING INTERFACE SIGNALS | | PCS STATUS | | COMMENTS |
|---|---|---|---|---|---|---|---|---|
| | M 1 | M 2 | | D1 | D2 | GATES | SYNC. STATUS | |
| G/C | OFF | OFF | ON | OFF | OFF | ON | GRID | |
| G/C --→ G/I | OFF | ON | ON --→ OFF | OFF | ON | OFF | CHANGING | |
| G/I | ON | ON | OFF | ON | ON | ON | XTAL 61 | |
| G/I --→ G/C | ON | OFF | OFF --→ ON | ON | OFF | OFF | CHANGING | SW 19 TURNS ON INDEPENDENT OF SYNC. |
| G/C | OFF | OFF | ON | OFF | OFF | ON | GRID | PCS TURNS ON WHEN SYNC. HAS CHANGED TO GRID |

SYSTEM FOR PROVIDING ASSURED POWER TO A CRITICAL LOAD

Matter enclosed in heavy brackets [ ] appears in the original patent but forms no part of this reissue specification; matter printed in italics indicates the additions made by reissue.

TECHNICAL FIELD

This invention relates generally to power systems, and more particularly to power systems for providing an assured, or uninterruptible, supply of electrical power to one or more critical loads. More particularly still, the invention relates to such power systems employing fuel cells as a source of electrical power.

BACKGROUND ART

By far, the most common source of electrical power for a great variety of loads is via the extensive power grid provided by the various electric utilities. The electrical power available on the utility grid is generally fairly reliable as to continuity and adherence to established standards of voltage, frequency, phase, etc. However, from time to time discontinuities and/or departure from those standards do occur. If they are brief or modest, most loads are relatively insensitive to those events. On the other hand, there are a growing number of loads which are relatively intolerant of even brief aberrations in the power supplied by the utility grid, with the principal example being computers and various types of electronic data processing devices. Even brief interruptions in the standardized supply of electric power by the utility grid may cause the computer to malfunction, with sometimes costly, and always bothersome, consequences.

In defining this concern, the Computer Business Equipment Manufacturers Association (formerly CBEMA, and not ITI) has developed a set of Power Acceptability Curves which establish the standards, or at least provide guidance, for determining the power norms which will assure continued operation of those types of loads. In that regard, a standard has been adopted indicating that a computer can tolerate a one half cycle or 8.3 ms power interruption. The power available on the utility grids is not presently capable of meeting this standard on a substantially continuous basis. Accordingly, it has been and is, necessary to provide supplemental mental power sources if it is important to assure that critical loads have a substantially continuous or uninterrupted supply of electrical power. For purposes of this application, a supply of power with interruptions or transfers of no greater than 8.3 ms duration, may be referred to as being "seamless", "substantially continuous", or "substantially uninterrupted".

Referring to FIG. 1, there is illustrated one existing form of uninterruptible power supply (UPS), a so-called "on-line" or "double conversion" type, used to supply a critical load in those instances when the utility grid supply is interrupted or is outside of specified limits. The utility grid power supply normally appears on conductor 110, and is passed via normally-closed contacts of a 3-pole transfer switch 112 to a rectifier 120, which supplies the critical loads 114 via an inverter 122. However, to provide continued power in and during those intervals when the utility grid power is not within the specified limits, a backup battery 116 is provided to supply immediate power of limited duration, and an emergency electrical generator 118 is then connected to the other contact of transfer switch 112 to follow-up with a longer term temporary supply. To accommodate the use of battery 116 in a system which relies on AC power for the loads 114, it is necessary to provide the rectifier 120 to charge battery 116 and the inverter 122 to convert the DC supply from the battery to the necessary AC supply for the loads. A high speed switch 124 connected between the transfer switch 112 and the loads 114 operates as a bypass switch to provide temporary power if the inverter 122 or rectifier 120 must be serviced. Because the grid and loads are not normally directly connected, but rather the power to the loads is required to pass through a pair of converters with the aid of the UPS battery, this type of UPS is termed an "in-line" or "double conversion" type. This arrangement, through effective, requires a number of costly components that are in use only during the intervals when the utility grid power is unsatisfactory.

Another arrangement of a power system for providing substantially uninterrupted power to critical loads is described in PCT application US99/10833 for "Power System", published on Nov. 25, 1999 as WO 99/60687. Referring to FIG. 2 in the present application, the relevant portions of the invention described in that PCT application are depicted in a very simplified, generalized form, with elements being numbered such that their last 2 digits are the same as their functionally equivalent counterparts in FIG. 1. The critical loads 214 receive substantially uninterrupted power from a motor-generator 230 within an uninterruptable power system module 231, which module also contains transfer switches, rectifiers and inverters. Several alternative electrical power sources are provided to maximize the continued powering of the motor-generator 230. One such power source may be the utility grid 210. Another source may be the fuel cell generator power plant 218. A transfer switching arrangement 212 enables one or the other of the utility grid 210 and the fuel cell 218 to normally provide the power to drive the motor-generator 230. This type of uninterruptible power supply is also of the "on-line" or "double conversion" type inasmuch as the grid is not directly connected to the loads 214, but acts through the rectifier and inverter converters and the flywheel and/or fuel cells to energize motor-generator 230 which in turn provides uninterrupted power. In fact, the fuel cell 218 is configured to operate in a grid contact (G/C) mode with the utility grid 210 for system economy, so in grid connected mode both the grid and the fuel cell supply the "grid" terminals of the transfer switch. In the event of failure of the grid supply 210, the fuel cell 218 is intended to serve as the continuing power source for the motor-generator 230. However, in such event, the fuel cell 218 must reconfigure from a "grid connect" (G/C) mode of operation to a "grid independent" (G/I) mode. The power conditioning system (PCS) portion of the fuel cell 218 includes associated inverters, switching transistors and breakers (not shown) that effect the conversion of DC power to AC power and that govern the fundamental G/C and G/I modes of fuel cell operation. That mode transition (from G/C to G/I) has typically required the fuel cell 218 and transfer switch 212 to interrupt power generation for up to 5 seconds. Such interruption is not "seamless", and would be of unacceptable duration for critical computer loads 214. Accordingly, a backup flywheel power source 216 provides immediately power of limited duration (similar to the battery source 116 in FIG. 1) to the motor-generator 230 at least during such mode conversions. That backup power source 216 is a flywheel 236 driving a bi-directional AC/DC converter 238. The converter 238 keeps the flywheel spinning during normal operation, and discharges the flywheel 236 during backup operation. The various transfer switches used in the transfer switching arrangement 212 and in the uninterruptable power system module 231 may be electromechanical, static, or a combination thereof, and serve to effect the various power switching functions.

While the Power System of the abovementioned PCT application may provide a substantially uninterrupted source of power to various critical loads and may advantageously employ fuel cells as one of the main sources of the power, it nevertheless requires the use of considerable additional equipment that is complex and costly. For example, the separate motor-generated 230, and the backup power source 216 which includes the flywheel 236/converter 238 combination, represent necessary, but expensive, components in order to assure the degree of power continuity sought and required.

Another type of UPS is of the "stand-by" type wherein the grid is directly connected to the loads and a stand-by UPS remains idle, even if connected to the loads, until a switch disconnects the grid from the loads. An example of such a system is disclosed in U.S. Pat. No. 6,011,324. The fuel cell and associated inverters are normally connected to the loads, but in an idle standby mode while the grid supplies power directly to the loads. When the grid fails, the fuel cell is rapidly brought to full output power and a solid state switch disconnects the grid. Here, too, a number of costly components are in use only during the intervals when the utility grid power is unsatisfactory. Accordingly, it is a principal object of the present invention to provide a power system for providing a substantially uninterrupted (seamless) supply of electric power to critical loads in a relatively economical manner.

It is a further object to provide such a power system in which one or more fuel cell power plant(s) are utilized to substantially continuously supply power to the loads.

DISCLOSURE OF THE INVENTION

According to the invention, there is provided a relatively economical and reliable power system for providing substantially uninterrupted electric power to one or more critical loads. A first power source, such as the utility grid, provides sufficient power to supply the critical loads. A second power source comprising at least one, and typically multiple, fuel cell power plants, provides sufficient power to supply at least the critical loads. The fuel cell power plant(s) is/are adapted to be, and is/are, substantially continuously connected to the critical loads and are substantially continuously providing significant power to at least the critical loads. A static switch operates to rapidly and seamlessly connect and disconnect the utility grid to the critical load(s) and to the fuel cell power plant(s), for economical continuous usage of the fuel cell power plant(s). Significant economy is realized by having the substantially continuously operating fuel cell(s) substantially continuously connected to the load, and normally also to the grid. In this way, the fuel cells may continuously deliver their rated power, with the requisite portion going to the critical loads and any excess being delivered to non-critical loads and/or the grid. The static switch may be one or more silicon controlled rectifiers (SCRs), or thyristors. Solid-state switch controls operate to rapidly switch the static switch in 4 ms, or less, to make seamless transfers between the first and second power sources. This switching speed is significantly faster than is obtained with conventional line commutation of thyristors. Further control electronics provide high-speed transitions (less than about 4 ms) in the operating modes of the power conditioning system (PCS) inverters associated with each of the fuel cell power plants. This assures that the fuel cell mode transitions, heretofore normally slow, are at a speed comparable to that of the static switch so as to provide substantially seamless power transfers of and between the first and second power sources. This allows continuous productive operation of the fuel cell power plants.

The foregoing features and advantages of the present invention will become more apparent in light of the following detailed description of exemplary embodiments thereof as illustrated in the accompanying drawings.

BRIEF DESCRIPTION OF DRAWINGS

FIG. 6 is table of the operational mode states of the fuel cell(s) in association with mode-controlling signals.

BEST MODE FOR CARRYING OUT THE INVENTION

Figure 1:
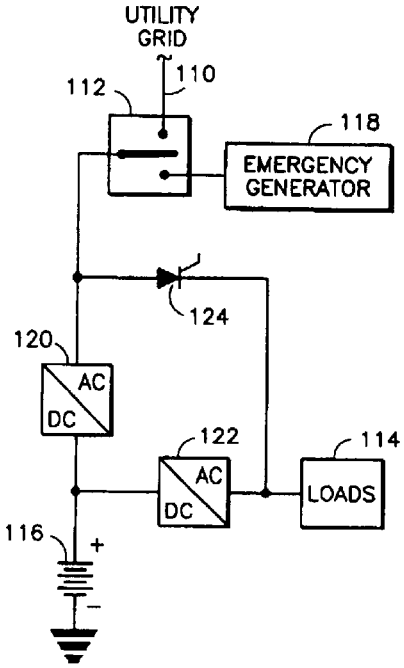
FIG.1 Prior Art
FIG. 1 is a simplified schematic block diagram of one type of uninterruptible power supply in accordance with the prior art.
Figure 1:
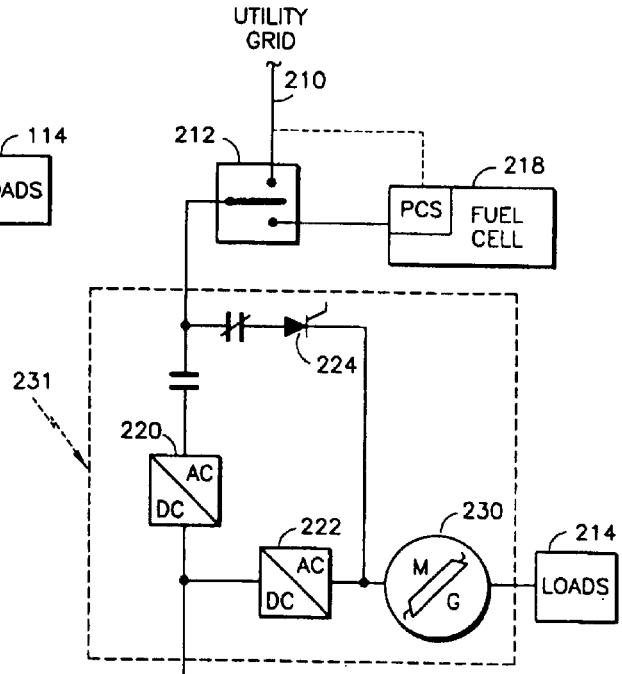
FIG.1 Prior Art
Figure 2:
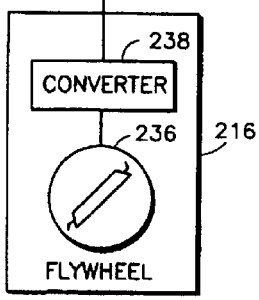
FIG.2 Prior Art
FIG. 2 is a simplified schematic block diagram of an uninterruptible power supply employing fuel cell power plants in accordance with the prior art.

Referring to the Drawings, FIGS. 1 and 2 depict prior types of uninterrupted power systems as previously described in the Background Art.

Figure 3:
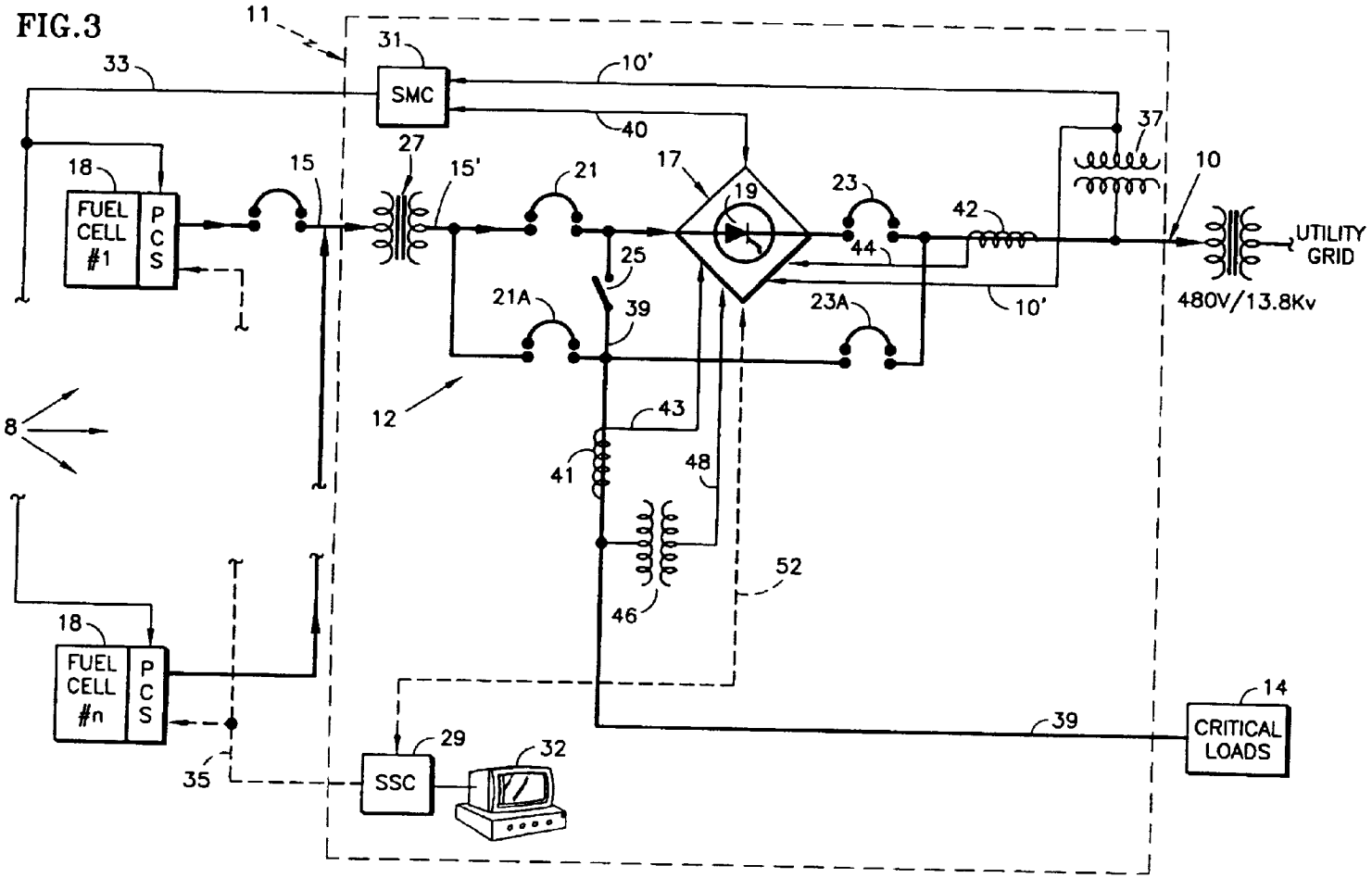
FIG. 3 is simplified schematic block diagram of a power system employing a fuel cell power plant, static switch and site control in accordance with the invention.

Referring to FIG. 3, there is depicted a simplified schematic block diagram of a power system 8 in accordance with the invention. The power system 8 is connected to utility grid bus 10, and employs one or more fuel cell power plants 18 at a site, for supplying 3-phase power substantially continuously to and through load contactors (not shown), to load(s) 14, usually also at the site. For simplicity, a "one line" diagram, or representation, is used herein to depict the 3-phase supply lines, as well as their included switches, etc. The grid 10, the fuel cell power plants 18, and the load(s) 14 are interconnected and controlled through a site management system (SMS), generally represented by the broken line block, or grouping, 11. The load(s) 14 typically include a number of individual customer loads, at least some of which require a substantially continuous supply of power and are thus deemed "critical loads". The critical loads 14 are typically computers, control devices employing computers, and/or electronic data processing devices. For convenience of explanation and visual distinction, the portions of the schematic carrying the relatively higher voltage/current/power to the load(s) 14 are bolded, in contrast with the lower-voltage, control portions of the system 8.

The utility grid bus 10 normally provides power at 480 $V_{AC}$ and 60 Hz, as do the fuel cell power plants 18 via lead, or bus, 15. Switching gear, generally designated 12, serves to interconnect the fuel cell(s) 18, the load(s) 14 and the utility grid 10. In this way, the fuel cells 18 are available and connected for supplying electrical power on a full time basis to the loads 14 and/or to the utility grid 10, for economical usage of the fuel cells. The switching gear 12 includes a static switch module 17 for selectively connecting and disconnecting the utility grid bus 10 to the loads 14 and to the fuel cells 18, as will be described. The static switch module 17 includes a 3-pole electrically operated static switch 19 rated at 2000 amperes and capable of performing seamless switching transfer of power in about ¼ cycle (about 4 ms). The switching gear 12 further includes several inter-tie or breaker switches 21, 21A, 23, 23A, and isolation switch 25 for further selectively connecting and disconnecting the fuel cells 18, loads 14, utility grid bus 10 and static switch module 17, relative to one another, primarily to isolate the static switch 19 for servicing and continue to provide power to the load(s) 14. A secondary purpose is to allow large fault currents to flow through breaker 23A instead of static switch 19 if such a fault in the load 14 should occur.

The fuel cell(s) 18 may be a single power plant, or multiple (i.e., "n") plants, connected to provide power to the loads 14 and/or to the utility grid 10. In an exemplary embodiment, there are five fuel cell power plants 18, each being a 200 kw ONSI PC25™C power plant, for collectively providing up to 1 megawatt of power. In addition to a fuel processor and the fuel cell stack itself, each power plant 18 also includes a power conditioning system (PCS) that contains a solid-state inverter which converts DC power to AC power at the desired voltage and frequency. Control of and by the PCS further enables conversion of the mode of operation of a fuel cell power plant 18 from G/C to G/I, and vice versa, as will be described in greater detail. When used in G/C mode, the variable controlled by the PCS is power delivered (both real and reactive). When used in the G/I mode, the variables controlled are output voltage and frequency, and, if multiple power plants 18 are involved, phase. The output voltage of a three-phase system is, of course, controlled to be at a phase angle of 120° between each phase. The outputs of the several fuel cell power plants 18 are collectively joined by bus 15, which is connected through a delta-to-wye transformer 27 and bus 15' to the switching gear 12. The transformer 27 provides a separately derived neutral/ground system for the load 14, and also provides isolation between the fuel cell PCS and the load 14 and/or the utility grid bus 10.

A site supervisory control (SSC) 29 provides the operator interface for the system 8 and may be responsible for control of the system at a high level. The SSC 29 allows the operator to issue high level commands such as "start", "stop", and the like. The SSC 29 may include one or more programmable logic controllers, data processors, computers, sensors, etc. to effect the control of the various components and functions of the system 8. An operator console 32 provides a display and input capability for the SSC 29. The SSC 29 may provide limited control of switching gear 12, as through a link 52, although principal control of that switching gear occurs automatically by the static switch 19.

There is also provided a site management control (SMC) 31 for providing direct control of the PCS's of the fuel cells 18, in response to signals from the static switch module 17, as well as the grid voltage reference signal 10' described below. The SMC 31 also may be composed of computers and associated sensors and control circuitry. The SMC 31 may be viewed and considered as an included portion of the SMS 11. Control bus 33 exchanges control signals between the SMC 31 and the PCS's of fuel cells 18. Control signals may also be exchanged between the SSC 29 and the fuel cells 18 via control bus 35, here shown in broken line. Control signals are exchanged between the SMC 31 and the static switch module 17 via control bus 40. A voltage, or potential, transformer 37 senses the 480 $V_{ac}$ grid voltage and communicates the stepped-down 120 $V_{ac}$ value, via bus 10', to the SMC 31 and the static switch module 17 for the purpose of providing control signals indicative of the grid's voltage, phase and frequency. The depicted location and quantity of transformer(s) 37 is mainly symbolic, and it should be understood that such transformer(s) may, alternatively, be incorporated as part of the control circuit or module for which the control signal is provided. A current transformer 41 senses the load current in a power bus path 39 connected to the loads 14, and communicates the value to the static switch module 17 via bus 43. Similarly, current transformer 42 senses grid current and communicates the value to the static switch module 17 via bus 44, and voltage transformer 46 senses load voltage and transmits it to the static switch module 17 via bus 48.

Figure 4:
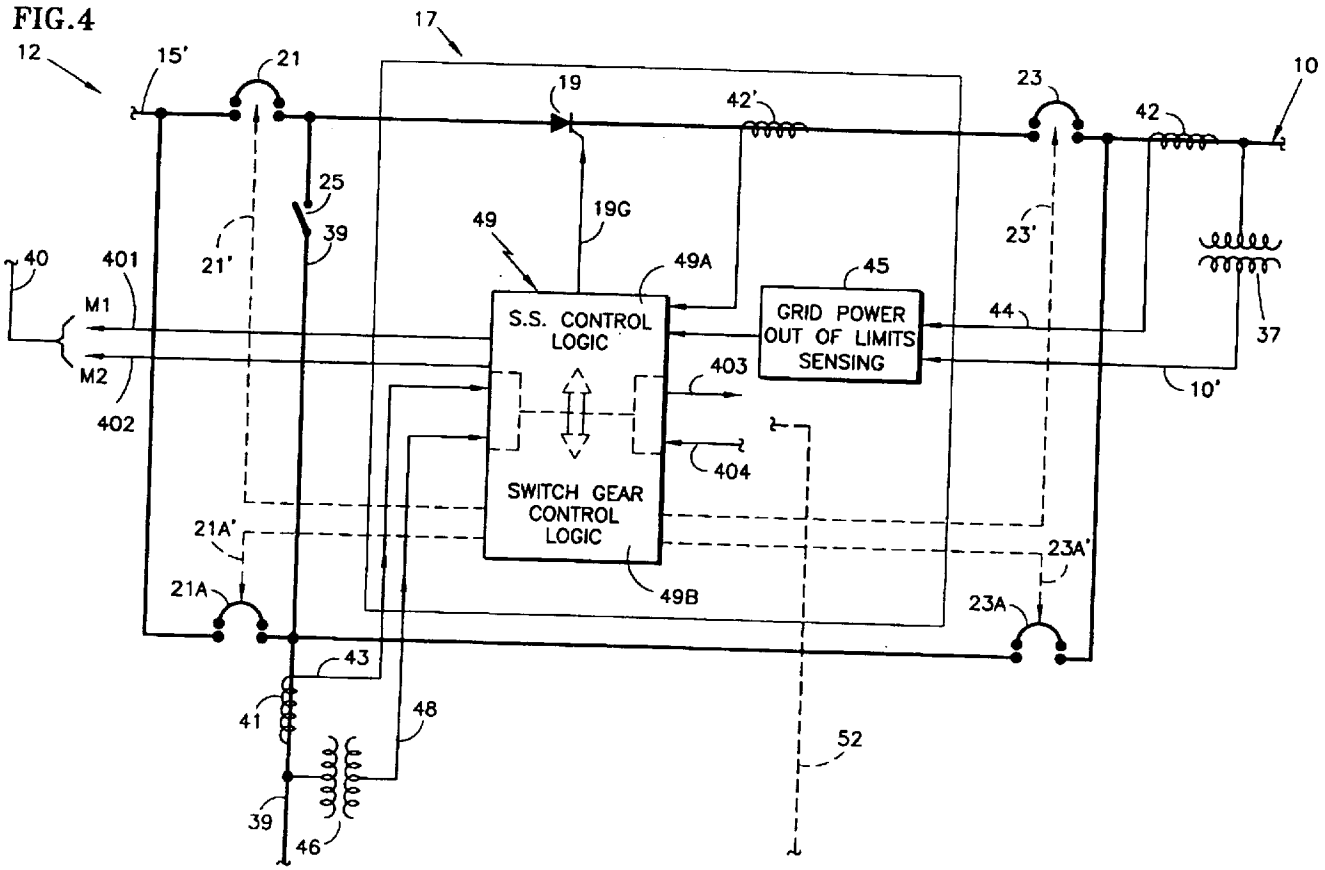
FIG. 4 is a schematic block diagram illustrating the static switch in greater detail.

Returning to further consideration of the switching gear 12, with reference additionally to FIG. 4, the power bus 15' from the fuel cells 18 is connected through breaker 21 to one pole of the static switch 19. The power bus path 39 extends from that pole of the static switch 19 through a normally-closed isolation switch 25 to the loads 14. The utility grid power bus 10 is extended to the other pole of the static switch 19 through breaker 23. The breaker switches 21 and 23 are intended to be closed during normal operation, such that power from the fuel cells 18 and/or the utility grid 10 may be supplied to the loads 14, assuming the static switch 19 is closed. Similarly, assuming the power delivered by the fuel cells 18 to the critical loads 14 is less than the cells' entire power output, the excess power from the fuel cells 18 may be delivered through the static switch 19 to the utility grid, or at least to customer non-critical loads (not shown) located on the grid side of static switch 19. In fact, this is the preferred economic mode of operation in that it maximizes the use of the fuel cells 18 and minimizes the need for and cost of, power from grid 10.

A bypass breaker switch 21A, connected from power bus 15' to the power bus path 39 between the loads 14 and the isolation switch 25 and being normally open, serves, when closed, to bypass breaker switch 21 for purposes of maintenance or isolation. Similarly, a bypass breaker switch 23A, connected from the utility grid bus 10 to the power bus path 39 between the loads 14 and the isolation switch 25 and being normally open, serves, when closed, to bypass breaker switch 23 and static switch 19 to supply grid power to loads 14, in the event the static switch fails or during maintenance or during a load fault sufficiently large to exceed the rating of the static switch. Breakers 21, 23, and 23A are electrically operated and are automatically controlled by the static switch 19 to perform transfers in 5 or 6 cycles, e.g., about 80–100 ms. The breaker switch 21A and isolation switch 25 are manual. The switches 21, 23, and 23A can also be manually controlled by the SSC 29. Each of the switches 21, 21A, 23, 23a, and 25 is rated 2000 amperes, and the circuit breakers have a fault interrupting rating of 65 kaic. The general communication link 52, shown in broken line between the switching gear 12 and the SSC 29, serves to convey appropriate status and manual control signals therebetween for the static switch 19 and the several breakers 21, 23, 23A, etc. Control logic 49 associated with static switch module 17, and particularly a switchgear control logic portion 49B thereof, serves to control the several breakers and switches 21, 21A, 23, and 23A, as represented by the broken line control paths 21', 21A', 23', and 23A' extending thereto. The control logic 49 is generally comprised of a high-speed logic portion 49A for rapidly controlling the static switch 19, and a relatively slower-speed portion 49B for controlling the remainder of switchgear 12.

Referring still further to FIG. 4, the static switch module 17 is depicted in greater detail. Although the static switch 19 is in fact three pairs of SCRs (thyristors), each pair being connected in parallel-opposed relation for conduction in either direction if the respective control gates 19G are enabled, only one of those SCRs is depicted in this view. The three pairs of SCRs are respectively for each of the 3 phases of power supply. Normally, the control gates 19G are connected in common and controlled in unison. Power on utility grid bus 10 and/or power on the fuel cell bus 15/15' may flow through the SCR's 19 when the control gates 19G are enabled, thereby allowing either source to power the loads 14.

The normal mode is G/C in which the utility grid 10 and the fuel cells 18 are connected. The module 17 includes circuitry 45 for sensing when the supply of power from the utility grid bus 10 is out of limits. Typically, these limits include a voltage and a current range relative to the standard or nominal values, and the sensing circuitry 45 provides a signal on lead 47 to control logic 49, and static switch control logic 49A thereof specifically, to indicate when the grid is outside those limits. The sensing or detection circuitry 45 is fast acting, providing a response in about 2 ms. Although not depicted, a separate fast acting frequency detector may monitor the grid frequency and provide an "in" or "out" "of limits" signal to the static switch control logic 49A. "Out of limit" grid signal values include, for example,: a) instantaneous and voltage magnitudes, on any phase, outside the range of 480 v+8% to −15%; b) instantaneous over-current, on any phase, greater than 2,000 amperes; c) frequency deviations from nominal 60 Hz value for more than 0.5 sec.; as well as others. The control logic 49A acts in response to the grid going out of limits, to provide a signal to the SCR gates 19G to disable them. The SCR's 19 will rapidly commutate off, thereby disconnecting the utility grid bus 10 from both the loads 14 and the fuel cells 18. A current sensor 42' senses the current through the SCRs and provides an indication to the control logic 49A of the occurrence of zero current through the SCRs. This information is used by the logic 49A to make the SCR commutation faster. This entire action typically occurs in about ¼ cycle (4 ms), thus facilitating a seamless transfer of power sources from the grid 10 and the fuel cells 18, to the fuel cells 18 alone, with the fuel cells reconfiguring as rapidly, as will be explained. This is significantly faster than the 8 ms or more required to commutate an SCR using conventional line commutation.

The control logic 49B also uses the voltage and current sensors 37, 41, 42, and 46 to operate the switching gear devices 21, 23, and 23A under various grid, load, and fuel cell out of limit or fault, conditions. For example, if a load over-current condition exists such that the current rating of the static switch 19 may be exceeded, switch 23A is closed to conduct the fault current to the load 14, by-passing the static switch. As a further example, a fuel cell fault can be indirectly detected by observing a low load voltage and perhaps a high grid current but no load over-current. In such event, switch 21 is opened to isolate the fuel cell fault from the load 14. The control logic 49A also provides an M1 mode signal on lead 401 and an M2 mode signal on lead 402. For manual control from the SSC 29, a G/I status signal is provided by control logic 49 on lead 403, and a SW19 Enable signal is received on lead 404. The signals 401 and 402 are part of the control signal bus 40, and the signals on leads 403 and 404 may be conveyed via communications link 52. When the sensing circuitry 45 senses the grid to be out of limits, it causes the M2 mode signal on lead 402 to transition from an "Off" to an "On" state to signal a need for, and to initiate, a mode change. Similarly, but slightly delayed, when the static switch 19 has actually opened in response to the sensed out of limits condition of the grid, the M1 mode signal on lead 401 transitions from an "Off" to an "On" state to signal nominal completion of the mode change. The reverse occurs when the sensing circuitry determines that the grid power supply has been returned to within the acceptable limits, with the M2 signal again leading the M1 signal.

Figure 5:
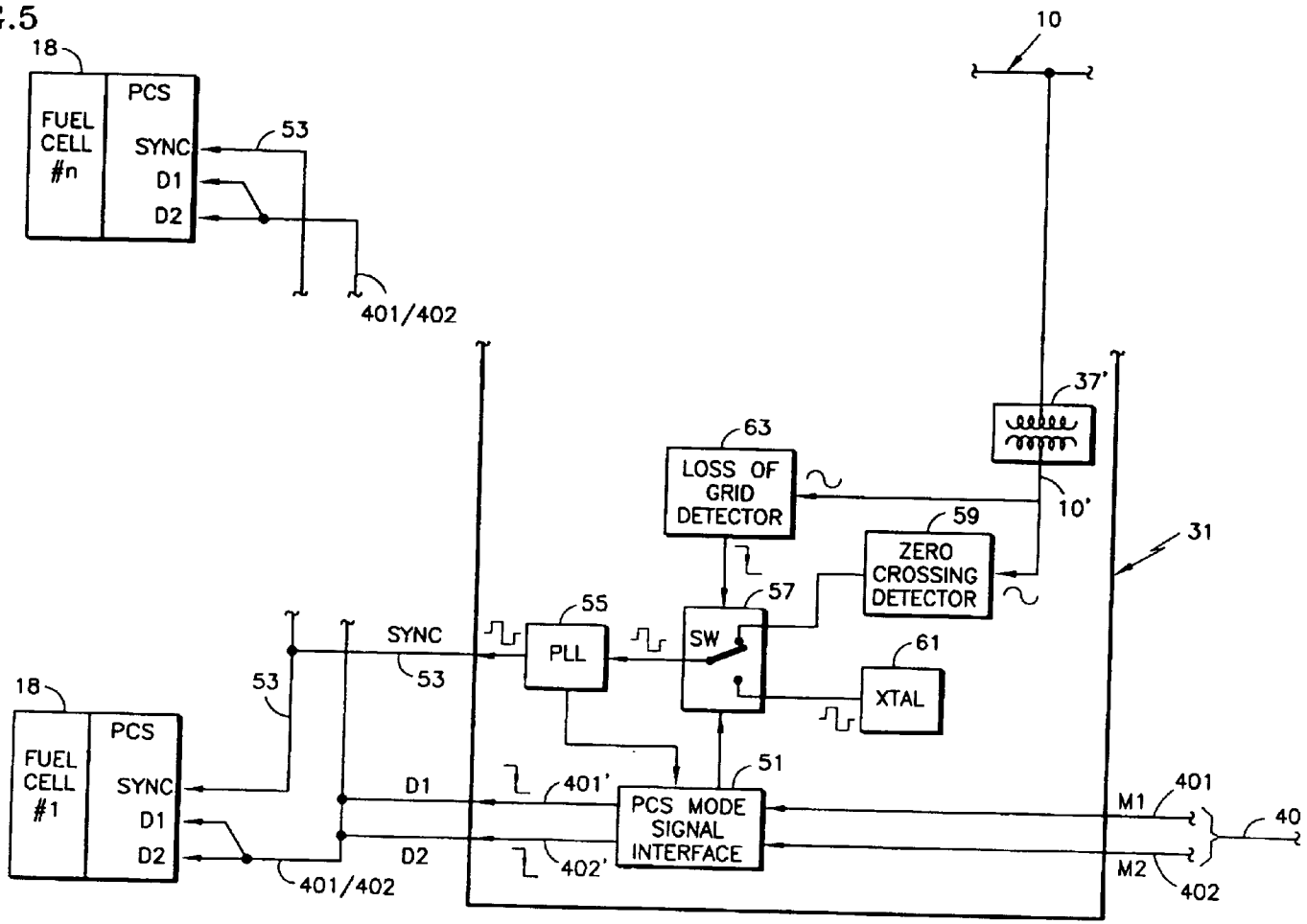
FIG. 5 is a schematic block diagram illustrating the site control in greater detail.

Referring to FIG. 5, a relevant portion of the SMC 31 and its control of the fuel cell 18 PCSs is depicted in greater detail, though it will be understood that the SMC provides additional control functions such as load sharing and the like, not shown. As mentioned above, the potential transformer 37, here depicted in the alternative as a separate transformer 37', is incorporated as part of the SMC 31. The M1 and M2 signals from the static switch module 17 are inputted to an interface circuit 51, which conditions each of those signals to provide respective discrete signals D1 and D2 on leads 401' and 402' connected to the PCS portion of each of the several fuel cell power plants 18 for controlling gating and sequencing of the inverters (not shown) therein during mode changes.

Synchronization of the fuel cell power plants 18 in either the G/C or the G/I mode is effected by a "sync" signal appearing on lead 53. The sync signal is provided through a phase-lock loop 55 receiving alternative inputs, through switch 57, from either a zero-crossing detector 59 connected to the stepped-down utility grid bus 10' or an internal frequency source, such as crystal 61. A "loss of grid" detector 63, similar to circuit 45, is connected to the stepped-down utility grid bus 10', and provides a control signal which actuates 3-pole switch 57 as a function of whether or not the grid power is within limits. The interface circuit 51 also is responsive to the M1 and M2 mode signals to provide a signal extended to switch 57 to toggle that switch as a function of the respective mode. It will be understood that detector 63 might be omitted and the output of detector circuit 45 from module 17 used in its stead to control the M1 and M2 mode signals applied to interface circuit 51, which in turn controls the switch 57. The switch is depicted in the normal G/C mode in which the synchronization signal provided to the PCS of the fuel cells 18 is that of the utility, such that the frequency and phase of the outputs from the fuel cell inverters are controlled to become and be, the same as it.

When the system 8 operates in the G/I mode, the frequency and phasing of the outputs of fuel cells 18 is determined by the crystal 61. When the utility grid power source returns to within limits and the system 8 is to be returned to the G/C mode, the phase and frequency sources are similarly returned. The phase lock loop 55 slews the sync signal in its transition from one mode to the other to avoid steps or discontinuities.

The solid state inverters of the PCSs of the respective fuel cell power plants 18, and the high speed solid state gates (not shown) which control them, are capable of responding in the ½ cycle (4 ms) needed for the seamless transfer of power sources. Thus, these inverters, through control of their gates by the mode control signals D1 and D2, are able to effect mode changes of the fuel cells 18 rapidly enough to accomplish the seamless transfers. This enables the fuel cell power plants 18 to operate substantially continuously in a power generating mode, either G/C or G/I, with but a momentary (less than 4 ms) interruption as they are reconfigured for operating in the opposite mode. The power conditioning systems (PCSs), and particularly their inverters and associated gating logic and control, for each fuel cell power plant 18 are of a type manufactured by Magne Tek Inc. of New Berlin, Wis.

Reference to the Table depicted in FIG. 6, in combination with the description of the power system 8 provided above and hereinafter, will complete an understanding of the invention. During normal G/C operation, both mode signals M1 and M2, and thus also D1 and D2, are "Off", the static switch 19 is "On" (conducting/closed), the inverter gates in the PCSs are enabled, and the sync for the system 8, and particularly the fuel cell PCSs, is provided by the utility grid bus.

Specifically, M2 rapidly transitions to "On", while M1 remains "Off" for the brief interval required for switch 19 to transition from "On" to "Off". The discrete signals D1 and D2 have the same states as M1 and M2, respectively. The transition of signal M2 (and thus D2) to the "On" state serves to briefly turn "Off" the inverter gates in the PCSs such that, for a brief interval less than 4 ms, the PCSs of the fuel cells 18 do not provide an electrical power output while they are being reconfigured to the G/I mode of operation. During this interval, the PCS output regulators are being reconfigured, such that in the G/C mode they regulate power (real) and VARs and in the G/I mode they regulate voltage and frequency. The sync is also being reconfigured during this interval. This interruption is sufficiently brief and the switch 19 sufficiently fast, that there is little or no chance for an overload on grid 10 to adversely impact the remainder of power system 8.

After this brief interval of 4 ms, or less, the system 8 is reconfigured and operating in the G/I mode. The mode signals M1 and M2 (and thus also, D1 and D2) are both "On", the switch 19 is "Off" (open) such that the system is disconnected from the utility grid bus 8, and the inverter gates in the PCSs are again on to provide power to the load(s) 14 from the fuel cells 18. At this time, the output from the PCSs is being "clocked", or synchronized, by the crystal 61. In the G/I mode, the fuel cell power plants 18 supply, or continue to supply, power to the loads 14 at regulated voltage and frequency without involvement of the utility grid, at least to the maximum capacity of the collective fuel cells.

At such time as the utility grid bus 10 comes back within acceptable limits as determined by sensor 45, the control logic 49 of the static switch module 17 reverses the prior mode change sequence and begins the transition from the G/I mode back to the G/C mode. Mode signal M2 first goes "Off" while M1 briefly remains "On", the switch 19 quickly transitions from "Off" to "On" such that the utility grid bus 10 is once again connected to the loads 14 together with the fuel cells 18, the PCS inverter gates are again briefly "Off" during reconfiguring, and the PCS synchronization is changing from reliance on crystal 61 to that of the utility grid supply. The internal PCS output regulation changes from voltage and frequency to power and VARs. Following the brief interval (less than 4 ms) for reconfiguring, the system 8 has been returned to the G/C state, or mode.

Although the invention has been described and illustrated with respect to the exemplary embodiments thereof, it should be understood by those skilled in the art that the foregoing and various other changes, omissions and additions may be made without departing from the spirit and scope of the invention. For example, the static switch module 17, and particularly switch 19 therein, is/are depicted as being separate from and external to, the fuel cells 18 and their respective PCS's, thus providing the economy of singular control elements responsible for controlling multiple fuel cells. However, it will be appreciated that these controls could be integral with or internal to the respective fuel cells, particularly if there is but a single fuel cell power plant. Moreover, although the static switch 19 is described in the context of pairs of SCRs, it will be appreciated that other static switching devices capable of similar switching speeds and current ratings may also be used. It will also be understood that a greater or lesser number of fuel cell power plants may be employed, and both the voltage and the current ratings associated with the elements discussed herein may be greater or less than described. Similarly, the control circuits described herein as being in the static switch module 17 could reside in the SMC 31.

What is claimed is:

1. A power system (8) for providing uninterrupted electric power to a critical load (14), comprising:

a. a first power source (10) providing sufficient power to supply the critical load (14);

b. a second power source (18) comprising at least one fuel cell power plant (18), the second power source providing sufficient power to supply the critical load (14) and adapted to be normally substantially continuously connected and providing power to, the critical load (14);

c. a static switch (19) for selectively connecting and disconnecting the first power source (10) to the second power source (18) and [(]to[)] the critical load (14); and d. a switch controller (49, 45) for controlling the state of the static switch (19) to connect the first power source (10) with the critical load (14) and the second power source (18) during normal operation of the first power source (10) and to rapidly disconnect the first power source (10) from the critical load (14) and the second power source (18) if and when operation of the first power source (10) deviates beyond a limit from normal.

2. The power system (8) of claim 1 wherein the switch controller (49, 45) additionally controls the state of the static switch (19) to rapidly reconnect the first power source (10) with the critical load (14) and the second power source (18) when the first power source (10) returns to normal operation.

3. The power system (8) of claim 1 wherein the second power source (18) comprises only one or more fuel cell power plants (18).

4. The power system (8) of claim 1 wherein the static switch (19) is a solid-state device.

5. The power system (8) of claim 4 wherein the solid-state device is a thyristor (19).

6. The power system (8) of claim 1 wherein the first power source (10) is a utility power grid and wherein each fuel cell power plant (18) includes a power conditioning system (PCS) for configuring operation of the respective fuel cell (18) in a grid connected mode or in a grid independent mode in response to mode control signals (D1'/401', D2/402'), and including a site management controller (31) connected intermediate the switch controller (49, 45) and the power conditioning system (PCS) and responsive to preliminary mode signals (M1/401, M2/402) from the switch controller (49, 45) for providing the mode control signals (D1/401', D2'/402') to the fuel cell power conditioning system (PCS), whereby the fuel cell power plants (18) rapidly transition operation between the grid connected and the grid independent modes.

7. The power system of claim 6 wherein the rapid disconnection of the first power source (10) from the critical load (14) and the second power source (18), and the rapid transitioning of operation of the at least one fuel cell (18) between the grid connected mode and the grid independent mode occurs within an interval of about 4 milliseconds.

8. The power system of claim 1 wherein the rapid disconnection of the first power source (10) from the critical load (14) and the second power source (18) occurs within an interval of about 4 milliseconds.

9. A power system (8) for providing substantially continuous electric power to at least at critical load (14), comprising:

a. a utility grid power source (10) providing sufficient power to supply the critical load (14);

b. at least one fuel cell power plant (18) operating substantially continuously for providing at least sufficient power to supply the critical load (14), the at least one fuel cell power plant (18) including a power conditioning system (PCS) for configuring operation of the respective fuel cell (18) in a grid connected mode or in a grid independent mode in response to mode control signals (D1'/401', D2/402'), the at least one fuel cell power plant (18) being normally substantially continuously connected and providing power to, the critical load (14);

c. a static switch (19) for selectively connecting and disconnecting the grid power source (10) to the at least one fuel cell power plant (18) and to the critical load (14);

d. a switch controller (49, 45) for controlling the state of the static switch (19) to connect the grid power source (10) with the critical load (14) and the at least one fuel cell power plant (18) during normal operation of the grid power source (10) and to disconnect, within a 4 millisecond interval, the grid power source (10) from the critical load (14) and the at least one fuel cell power plant (18) when the grid power source deviates beyond a limit from normal, and e. a site management controller (31) connected between the switch controller (49, 45) and the power conditioning system (PCS) and responsive to preliminary mode signals (M1/401, M2/402) from the switch controller (49, 45) for providing the mode control signals (D1/401', D2/402') to the fuel cell power conditioning system (PCS) to cause the at least one fuel cell power plant (18) to rapidly transition operation, within a 4 millisecond interval, between the grid connected mode and the grid independent mode.

10. A power system (8) for providing substantially continuous electric power to at least a critical load (14), comprising:

a. a utility grid power source (10) providing sufficient power to supply the critical load (14);

b. at least one fuel cell power plant (18) operating substantially continuously for providing at least sufficient power to supply the critical load (14), the at least one fuel cell power plant (18) including a power conditioning system (PCS) for configuring operation of the respective fuel cell (18) in a grid connected mode or in a grid independent mode in response to mode control signals (D1/401', D2/402'), the at least one fuel cell power plant (18) being normally substantially continuously connected and providing power to, the critical load (14);

c. a static switch (19) for selectively connecting and disconnecting the grid power source (10) to the at least one fuel cell power plant (18) and to the critical load (14);

d. a switch controller (49, 45) for controlling the state of the static switch (19) to connect the grid power source (10) with the critical load (14) and the at least one fuel cell power plant (18) during normal operation of the grid power source (10) and to disconnect, within less than an 8.3 millisecond interval, the grid power source (10) from the critical load (14) and the at least one fuel cell power plant (18) when the grid power source deviates beyond a limit from normal; and e. a site management controller (31) connected with the switch controller (49, 45) and the power conditioning system (PCS) and responsive to the switch controller (49, 45) for providing mode control signals (D1/401', D2/402') to the fuel cell power conditioning system (PCS) to cause the at least one fuel cell power plant (18) to rapidly transition operation, within less than an 8.3 millisecond interval, between the grid connected mode and the grid independent mode.

11. The power system (8) of claim 10 wherein the at least one fuel cell power plant (18) is caused to rapidly transition operation between the grid connected mode and the grid independent mode in an interval of less than about 4 milliseconds.

*12. A power system (8) for providing uninterrupted electric power to a critical load (14), comprising:*

*a. a first power source (10) providing sufficient power to supply the critical load (14);*

*b. a second power source (18), the second power source providing sufficient power to supply the critical load (14) and adapted to be normally substantially continuously connected and providing power to, the critical load (14);*

*c. a static switch (19) for selectively connecting and disconnecting the first power source (10) to the second power source (18) and to the critical load (14); and*

*d. a switch controller (49, 45) for controlling the state of the static switch (19) to connect the first power source (10) with the critical load (14) and the second power source (18) during normal operation of the first power source (10) and to rapidly disconnect the first power source (10) from the critical load (14) and the second power source (18) if and when operation of the first power source (10) deviates beyond a limit from normal.*

*13. The power system (8) of claim 12 wherein the switch controller (49, 45) additionally controls the state of the static switch (19) to rapidly reconnect the first power source (10) with the critical load (14) and the second power source (18) when the first power source (10) returns to normal operation.*

*14. The power system (8) of claim 12 wherein the static switch (19) is a solid-state device.*

*15. The power system (8) of claim 14 wherein the solid-state device is a thyristor (19).*

*16. The power system (8) of claim 12 wherein the first power source (10) is a utility power grid and wherein the second power source (18) includes at least one power conditioning system (PCS) for configuring operation of the second power source (18) in a grid connected mode or in a grid independent mode in response to mode control signals (D1/401', D2/402'), and including a site management controller (31) connected intermediate the switch controller (49, 45) and the power conditioning system (PCS) and responsive to preliminary mode signals (M1/401, M2/402) from the switch controller (49, 45) for providing the mode control signals (D1/401', D2/402') to the second power source power conditioning system (PCS), whereby the second power source (18) rapidly transitions operation between the grid connected and the grid independent modes.*

*17. The power system of claim 16 wherein the rapid disconnection of the first power source (10) from the critical load (14) and the second power source (18), and the rapid transitioning of operation of the second power source (18)*

*between the grid connected mode and the grid independent mode occurs within an interval of about 4 milliseconds.*

*18. The power system of claim 12 wherein the rapid disconnection of the first power source (10) from the critical load (14) and the second power source (18) occurs within an interval of less than about 8.3 milliseconds.*

*19. The power source of claim 18 wherein the rapid disconnection of the first power source (10) from the critical load (14) and the second power source (18) occurs within an interval of about 4 milliseconds.*

* * * * *